United States Patent [19]

Patton et al.

[11] 4,114,435
[45] Sep. 19, 1978

[54] WELL DRILLING SYSTEM

[75] Inventors: Bobbie J. Patton, Dallas; James H. Sexton, Duncanville; Wilton Gravley, Carrollton; C. Mackay Foster, Jr., Denton, all of Tex.

[73] Assignee: Mobil Oil Corporation, New York, N.Y.

[21] Appl. No.: 847,647

[22] Filed: Nov. 1, 1977

[51] Int. Cl.$^2$ ............................................. E21B 47/00
[52] U.S. Cl. ................................................. 73/151.5
[58] Field of Search .................... 73/151.5; 177/40; 33/125 B

[56] References Cited

U.S. PATENT DOCUMENTS

| 3,853,004 | 12/1974 | Westlake et al. | 73/151.5 |
| 3,916,684 | 11/1975 | Rundell | 73/151.5 |

Primary Examiner—Jerry W. Myracle
Attorney, Agent, or Firm—C. A. Huggett; George W. Hager, Jr.

[57] ABSTRACT

In a well drilling system, a drill bit is raised or lowered through formations surrounding a borehole in a response to the movement of a cable onto and off the drawworks drum. Prior to drilling operations, the drilling system is calibrated by lowering the traveling block to its lowest position above the rig floor. At this position, the distance from a predetermined reference point to the traveling block is measured as is the rotational position of the drawworks drum. Cabling is then taken into the drum until one full layering of cable is wound onto the drum. At this time, the distance from the fixed reference point to the new position of the traveling block is measured as is the amount of rotation of the drum required to move the traveling block to this position. These steps are repeated for each full layering of cable to be wound onto the drum before the traveling block reaches its maximum distance above the reference point to determine the amount of rotation required to move the traveling block the distances to the new positions. During drilling operations, the position of the traveling block in any given time is determined for any cable layering in accordance with a predetermined relationship between the measurements made during the calibration period.

4 Claims, 6 Drawing Figures

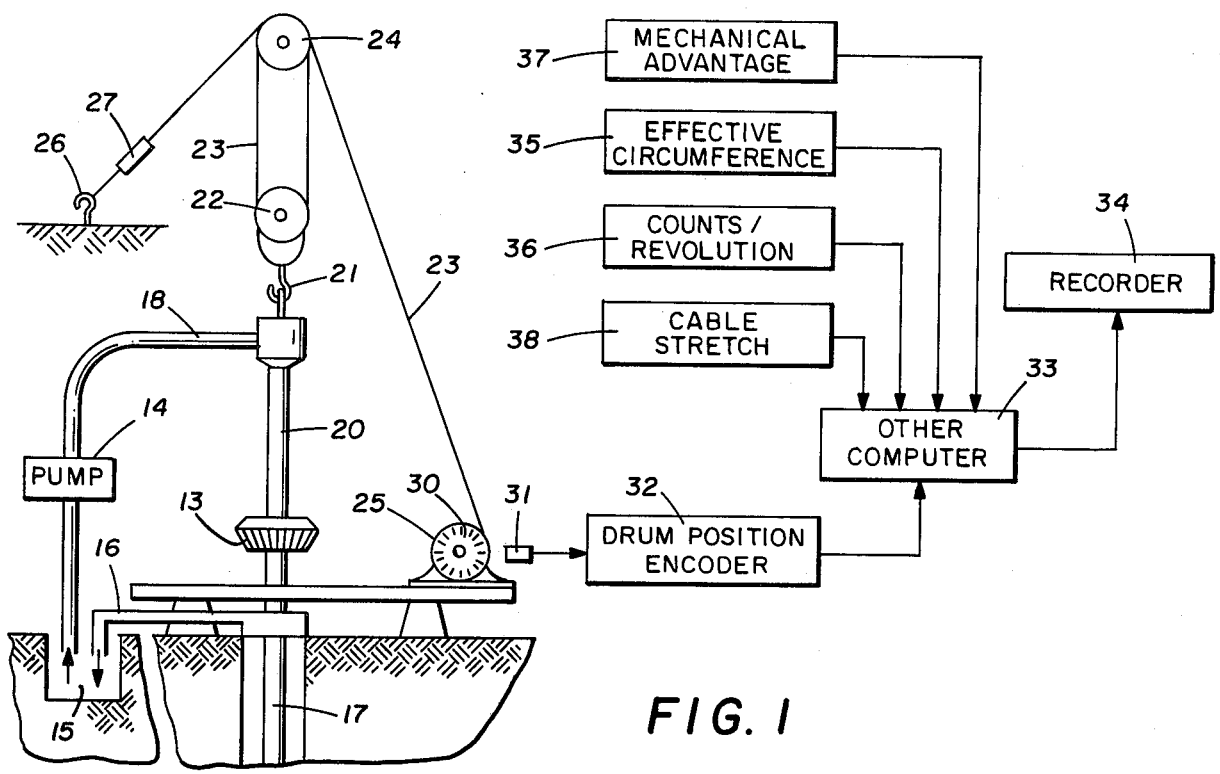
FIG. 1
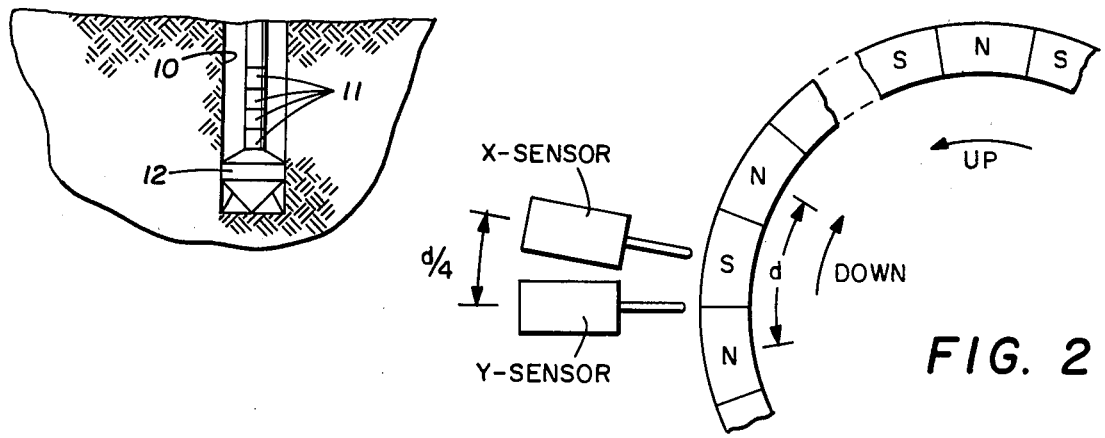
FIG. 2
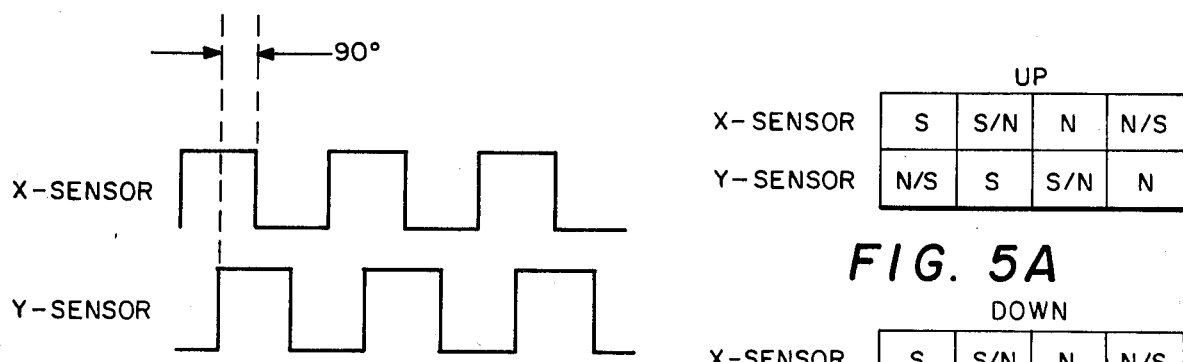
FIG. 3
FIG. 5A
FIG. 5B

WELL DRILLING SYSTEM

BACKGROUND OF THE INVENTION

This invention relates to well drilling operations and more particularly to a system for accurately determining the depth of the drilling tool in the well.

Drilling of oil wells has progressed from crude drilling rigs to cable tool rigs, to the modern rotary drilling rigs. In rotary drilling, a power rotating means delivers torque to a drill pipe which turns a bit drilling a borehole into the subsurface formations. The drill pipe is lowered and raised in the borehole by means of a support cable extending from a suitable drawworks drum. The depth of the bit in the borehole has, in the past, been measured by detecting movement of the support cable and then relating this movement to drill bit depth.

SUMMARY OF THE INVENTION

In a drilling system, a power rotating means delivers torque to rotate a drill bit located at the lower end of a drill pipe. This drill string is suspended from a traveling block which moves in response to movement of a cable extending from a drawworks drum and arranged over one or more sheaves mounted in a crown block. The traveling block is initially lowered to its lowest position above the rig floor. The distance from this position to a predetermined reference point is measured. Also, the rotational position of the drum at this position is measured. Thereafter, the traveling block is raised to a first position at which one full layering of cable is wound onto the drum. The distance from this position to the predetermined reference point is also measured, and the amount of rotation of the drum required to move the traveling block to this position is again measured. These steps are repeated for each full layering of the cable wound onto the drum before the traveling block reaches its maximum distance above the reference point. Thereafter, the position of the traveling block at any given time during drilling operations for any cable layering is determined by the amount of drum rotation in moving the traveling block to such position as modified in accordance with a predetermined relationship between the foregoing measurements taken for each position at which a full layering of cable has been wound onto the drum.

BRIEF DESCRIPTION OF THE DRAWINGS

FIG. 1 illustrates a well drilling system employing the present invention.

FIG. 2 illustrates a particular scheme for magnetically detecting rotational movement of the drawworks drum of FIG. 1.

FIG. 3 illustrates waveforms of the signals provided by the magnetic sensors of FIG. 2 when movement of the drawworks drum is UP and its rotation is at a constant angular velocity.

FIGS. 5A and 5B are truth tables depicting the selective gating features of the drum position encoder of FIG. 4.

DESCRIPTION OF THE PREFERRED EMBODIMENT

Figure 4:
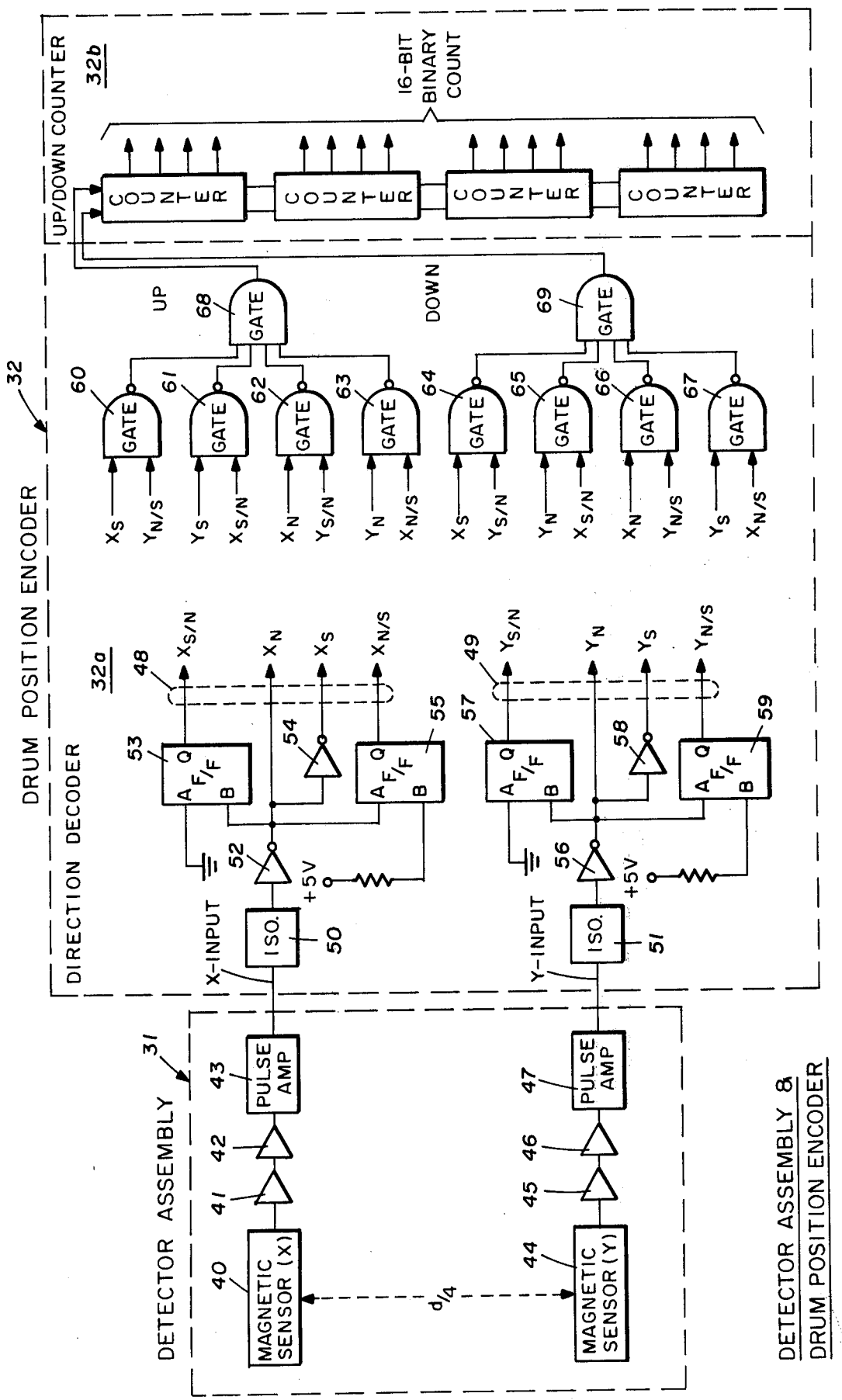
FIG. 4 is a schematic diagram of the detector assembly and drum position encoder of FIG. 1.

A brief description of a conventional, rotary drilling apparatus with which the drum position encoder of the present invention can be used will be given prior to the detailed description of the drum position encoder itself. Referring to FIG. 1, there is shown a well 10 being drilled in the earth by rotary drilling. A drill pipe 17 is suspended within the well 10 and includes at its lower end a plurality of drill collars 11 and a drill bit 12. A suitable prime mover (not shown) drives a rotary table 13 to rotate the drill pipe 17. A downward force is also impressed onto the drill bit 12 to cause it to penetrate the subsurface formations surrounding the well 10. The rotary table 13 does not impart torque directly to the drill pipe 17 but to a kelly 20 which is normally a square or hexagonal member which translates the torque to the drill pipe 17. Generally, the drill pipe is held in tension and only the weight of the drill collars 11 or less is allowed on the drill bit 12. Hence, a major portion of the load must be borne by a hook and swivel 21 attached to a traveling block 22. The traveling block is moved by multiple windings of cable 23 between it and a crown block 24. One end of the cable 23, the so-called "dead line", is held by a dead line anchor 26. In the cable, between the dead line anchor and the crown block, is a weight indicator transducer 27 by which the tension in the cable may be measured. The other end of the cable 23 is fastened to the drum 25 of the drawworks and is wound onto it by rotation of that drum. To achieve less or more weight on the drill bit 12, the traveling block 22 is raised or lowered to take more or less of the weight of the drill collar 11. Simultaneously with the rotation of the drill bit under a compressive force, a drilling fluid from a mud tank or mud pit 15 is circulated by a drilling fluid pump 14 through the line 18 into the kelly 20 and, hence, into the drill pipe 17. The drilling fluid then flows downward through the drill pipe 17 and the drill collars 11 and out through openings in the drill bit 12 into the well 10. The drilling fluid then circulates upward from the drill bit 12, carrying formation cuttings through the annulus between the drill pipe 17 and the well 10 to the surface of the earth. A line 16 returns the drilling fluid from the well 10 to the pit 15.

The cables 23 which raise or lower the traveling block 22 to raise or lower the drill pipe or to control the weight on the bit pass around the crown block 24 and extend to the drum 25 mounted on the platform of the rotary drilling rig. This drum 25 is rotated to take in or pay out the amount of cable 23 necessary to raise or lower the traveling block 22 the desired distance. In order to provide a direct correlation of the movement of the drum 25 to a unit of depth drilled by the drill bit 12, the drum or other rotating member whose rotation is proportional to that of the drum is periodically marked at locations around its periphery so as to form a concentric circle of magnetic indicators. As the drum 25 rotates to pay out or take in the cable 23, these magnetic markings, represented schematically at 30, pass by a detector assembly 31 and provide alternating voltage signals to indicate traveling block position in a manner described more fully below. Also drill bit depth can be determined as will be described more fully below.

In a preferred embodiment, the magnetic markings are placed on the drum 25 by means of a rubber-base magnetic strip or tape which is formed into a circle and fastened to the flange of the drawworks drum. The direction of magnetization of the tape is perpendicular to the exposed surface and is alternately into and out of the tape. Thus, north and south poles alternate periodically along the tape. A pair of Hall-effect sensors are incorporated into the detector assembly 31. These two sensors are aligned in the direction of the tape and spaced a distance apart equal to one quarter of the periodic distance between similar poles on the tape as illustrated in FIG. 2. The previously magnetized magnetic stripes on the tape enable these sensors in the detector assembly to produce alternating voltage signals in response to rotation of the drum 25 as shown in FIG. 3. As the drum 25 rotates, each sensor provides an alternating voltage signal in response to the magnetic marks passing its location adjacent the drum. Because of the relative positions of the sensors, the alternating voltage signal from one sensor is ahead of the signal from the other sensor in phase. These alternating voltage signals are received by the drum position encoder 32 to produce digital signals indicating both the direction and magnitude of drum rotation. These digital signals operate a bidirectional counter whose count output is indicative of the amount of cable 23 paid out from the drum 25 to the crown block 24 on the drilling rig. This count output of the drum position encoder is applied to the depth computer 33 where it is modified in accordance with (i) a predetermined value for the effective circumference 35 of a cable-turn on the drum 25, (ii) the number of counts for a complete revolution 36 of drum 25, (iii) the mechanical advantage 37 of the suspension system between the traveling block 22 and the crown block 24, and (iv) the stretch 38 of the unspooled cable from drum 25. This modified output of the depth computer 33 provides a direct correlation with the movement of the traveling block. The depth of drill bit 12 can be computed from this modified output, taking into account the number of strands of drill pipe in the borehole 10 and the stretch of such drill pipe. The recording equipment 34 is advanced in accordance with time to provide a depth recording indicating penetration of the drill bit through the formations surrounding the borehole 10. In this manner, the slope of the record made by the recording equipment 34 represents the rate of penetration, often called drilling rate. That is, the plot of penetration versus time. The rate of penetration can also be calculated independently of the recording equipment by means of the depth computer 33 which periodically divides the increase in depth in an interval of time by the value of the time increment.

Referring now to FIG. 4, the detector assembly 31 and drum position encoder 32 will be described in detail in conjunction with the production and decoding, respectively, of the alternating voltage signals from the two magnetic sensors. Magnetic sensor 40, identified as the X-sensor in FIGS. 2 and 3, applies its alternating voltage signal by way of amplifier 41, comparator 42, and a pulse amplifier 43 which produces current pulses to the X-input of the drum position encoder 32. In similar manner, magnetic sensor 44, identified as the Y-sensor in FIGS. 2 and 3, applies its alternating voltage signal by way of amplifier 45, comparator 46, and pulse amplifier 47 to the Y-input of the drum position encoder 32. These inputs to the drum position encoder 32 are square wave current pulses retaining the frequency and phase relationships of the alternating voltage signals from the magnetic sensors. The frequency content represents the rate of drum rotation and consequently the rate of movement of traveling block 22. The phase content represents the direction of drum rotation and consequently the direction of movement of traveling block 22. Drum position encoder 32 includes a direction decoder 32a and an UP/DOWN counter 32b. The direction decoder 32a operates upon the X and Y inputs from the magnetic sensors to provide UP and DOWN signals, indicating the number of magnetic transitions that have passed the magnetic sensors in an UP direction when the cable is being taken into the drum 25 and in a DOWN direction when the cable is being paid out from the drum 25. These two signals, UP and DOWN, are applied to the UP/DOWN counter 32b whose output is a binary count that is proportional to the absolute angular position of the drum 25 and which is sent to the depth computer 33. The count may also be taken by a binary-coded decimal counter, and output to a decimal display.

Referring now in more detail to the direction decoder 32a, the optical isolator 50, inverters 52 and 54, and one-shots 53 and 55 operate upon the alternating voltage signal applied to the X-input to provide the four signals $X_N$, $X_S$, $X_{N/S}$, and $X_{S/N}$ on lines 48. More particularly, the $X_N$ signal from inverter 52 will be at a logic 1 level when a north pole of the magnetic strip affixed to drum 25 is adjacent the magnetic sensor 40, or X-sensor. The inverter 54 operates to provide the $X_S$ signal at a logic 1 level when a south pole of the magnetic strip is adjacent the X-sensor. The $X_{N/S}$ signal is a logic 1 pulse produced by one-shot 55 at the instant of transition from a north pole to a south pole adjacent the X-sensor. The $X_{S/N}$ signal is a logic 1 pulse produced by one-shot 53 at the instant of transition from a south pole to a north pole adjacent the X-sensor. In similar manner, optical isolator 51, inverters 56 and 58, and one-shots 57 and 59 operate upon the alternating voltage signal applied to the Y-input to provide the four signals $Y_N$, $Y_S$, $Y_{N/S}$, and $Y_{S/N}$.

These eight signals $X_N$, $X_S$, $X_{N/S}$, and $X_{S/N}$ and $Y_N$, $Y_S$, $Y_{N/S}$, and $Y_{S/N}$ are selectively applied to the gates 60–67 in accordance with the truth tables of FIGS. 5A and 5B. The table of FIG. 5A illustrates the sequential positions of the poles of the magnetic strip adjacent the X and Y sensors when the drawworks drum 25 is rotating in a direction to move the traveling block 22 upward. The table of FIG. 5B illustrates the sequential positions of the poles of the magnetic strip adjacent the X and Y sensors when the drawworks drum 25 is rotating in a direction to move the traveling block 22 downward.

Referring in more detail now to the functions of gates 60–63 in accordance with the truth table of FIG. 5A, the $X_S$ and $Y_{N/S}$ signals are applied to NAND gate 60. The $X_S$ signal will be at a logic 1 when a south pole is adjacent the X-sensor, and the $Y_{N/S}$ signal will briefly assume a logic 1 value during a pulse triggered by a north-south pole transition adjacent the Y-sensor. When this occurs, the output of gate 60, which is normally at logic 1 level, will briefly go to logic 0. This particular occurrence is the one illustrated in FIG. 2. As the drum rotates to move the traveling block upward, the next count-producing position of the poles of the magnetic strip adjacent the X and Y sensors occurs when a south-north pole transition passes the X-sensor while a south pole is adjacent the Y-sensor. As the drum rotates past this position, the $Y_S$ signal will be a logic 1 during the pulse of signal $X_{S/N}$ to the input of gate 61. As the drum continues to rotate in the same direction, the next circumstance which produces a count pulse occurs when a north pole is adjacent the X-sensor, while an S/N transition occurs adjacent the Y-sensor. Accordingly, during the pulse triggered at this time, the $X_N$ and $Y_{S/N}$ signals sent to the input of gate 62 are logic 1. With further rotation, a north-south transition occurs adjacent the X-sensor, while a north pole is adjacent the Y-sensor. During the pulse at this time, the $X_{N/S}$ and $Y_N$ signals to gate 63 are a logic 1. If the drum continues to rotate in this direction, the above signals are transmitted to the gates repeatedly and sequentially. Any of the four count-producing circumstances enumerated above will cause one of the gates 60-63 to produce a brief downward pulse to logic 0 and return. Any such pulse input to the AND gate 68 will be transmitted and applied to the UP input of the UP/DOWN counter 32b. This counter includes the 4-bit binary counters 48-51 which count the pulses from gate 68 to provide a 16-bit binary count output that is proportional to the amount of cable taken into the drum 25 in moving the traveling block in an upward direction.

In similar manner to that described above, gates 64-67 and gate 69 operate in response to the selective combinations of the four signals $Y_N$, $Y_S$, $Y_{N/S}$, and $Y_{S/N}$ as illustrated in the truth table of FIG. 5B. When the direction of rotation of the drum 25 is such as to move the traveling block downward, gate 69 applies pulses to the DOWN input of the bidirectional counters 48-51 to provide a 16-bit binary count output that is proportional to the amount of cable paid out from the drum 25 in moving the traveling block 22 in a downward direction.

For the direction decoder 32a to operate successfully, the duration of the pulses from the one-shots 53, 55, 57 and 59 must be less than one-half event spacing (i.e., one-quarter of the waveform of FIG. 3) at the maximum angular velocity of the drawworks drum 25.

The UP and DOWN counts from gates 68 and 69 can also be led to a binary coded decimal UP/DOWN counter for direct display in decimal form.

As previously mentioned, the output of the drum position encoder 32 is operated upon by the depth computer 33 to give a correct depth indication for the drill bit based upon, among other things, the effective circumference of the drum (including the layers of cable wrapped around it). This effective circumference of the drum depends upon the diameter of the drum, $D_{drum}$; the diameter of the cable, $D_{cable}$; the layer number of the cable being paid out or taken in, $n$; and the number of cables, N, extending between the drum and the traveling block 24 (which has been referred to above as the mechanical advantage of the suspension system). A general expression for the effective drum diameter based upon the foregoing parameters is as follows:

$$D_{eff} = D_{drum} + D_{cable}[1+(n-1)\sqrt{3}] \quad (1)$$

Consequently, the movement of the traveling block for each revolution of the drum can be expressed as follows:

$$\text{BLOCK MOVEMENT/REV} = \pi D_{eff}/N \quad (2)$$

Such Equation (2) shows that the number of feet of movement of the traveling block 24 for each revolution of the drum 25 is a constant within any given cable layer $n$ on the drum 25. In addition, the depth computer 33 must also take into account the number of sections of pipe in the hole and the stretch of that pipe as calculated from the dead line tension measured by transducer 27.

In calibrating the depth computer 33 output to indicate the correct movement in feet of the traveling block, the following steps are carried out. (1) The traveling block is initially positioned in the kelly-down position which is defined as the position of the traveling block when the kelly has reached its lowest position in the kelly bushing in the rotary table. At this position, the weight of the drill pipe is transferred to the kelly bushing and most of the drilling cable has been paid off the drum 25, with usually less than one layer of cabling left on the drum 25. (2) A predetermined block position, X, for the kelly-down position is entered into the depth computer. The calculated block position, BP, will be positive in the upward direction (3) A predetermined number of timing signals $C_0$ is entered into the computer to coincide with the predetermined lowest block position from step (2). This number $C_0$ can conveniently be near the maximum which can be contained in the count register; for, as the block is raised, counts will be subtracted from it. (4) The height $T_0$ from a selected reference point near the rig floor to the traveling block is measured, and this measurement is entered into the depth computer 33. (5) The traveling block is then raised until exactly one layer of drilling cable is on the drum. The height of the traveling block is then measured from the same reference point of step (4). This measurement is defined as $T_1$ and is read into the computer. The count output of the drum position encoder is then read into the computer to correspond with this depth $T_1$. This drum position encoder reading is designated as $C_1$. The traveling block is then again raised until there are exactly two layers of drilling cable on the drum. The height of the traveling block from the same reference point as in step (4) is again measured, and this measurement entered into the depth computer as $T_2$. The drum position encoder's count output is also entered as $C_2$. Steps such as (5) and (6) are continually repeated for successive layers of the drilling cable on the drum. At the maximum height for the traveling block, the brake is locked on the drum 25. At this point, the measurement $T_c$ is entered into the depth computer for the height of the traveling block from the same reference point as in step (4). Also, the count output of the drum position encoder, which has now reached a minimum value, is read into the depth computer 33 as $C_c$. This procedure assumes that the drum is locked somewhere between complete layers of drilling cable being wrapped around the drum when the block has reached its maximum height. These measurements fed into the depth computer 33 during calibration operation provide for an absolute value of the block position during drilling operations based upon the following TABLE I.

TABLE I

| Count | Block Position (feet) | Tape Reading (feet) |
|---|---|---|
| $C_0$ | X | $T_0$ (Kelly Down) |
| $C_1$ | $X-(T_1 - T_0)$ | $T_1$ (Exactly 1 cable layer) |
| $C_2$ | $X-(T_2 - T_0)$ | $T_2$ (Exactly 2 cable layers) |
| $C_3$ | $X-(T_3 - T_0)$ | $T_3$ (Exactly 3 cable layers) |
| $C_c$ | $X-(T_4 - T_0)$ | $T_c$ |

From the foregoing TABLE I it can be seen that for any block position count greater than $C_1$ but less than $C_0$ the first cable layering block position in feet can be represented by the following equation:

$$BP \text{ (feet)} = X - (T_1 - T_0) + \left(\frac{T_1 - T_0}{C_0 - C_1}\right)(C' - C_1) \quad (3)$$

where, C' is the current reading from the drum position encoder during the drilling operation.

Likewise, for any count greater than $C_2$ but less than $C_1$, the block position in feet for the second layering of cable can be expressed as follows:

$$BP \text{ (feet)} = X - (T_2 - T_0) + \left(\frac{T_2 - T_1}{C_1 - C_2}\right)(C - C_2) \quad (4)$$

Likewise, for any count greater than $C_3$ but less than $C_2$, the block position in feet for the third layering can be represented as follows:

$$BP \text{ (feet)} = X - (T_3 - T_0) + \left(\frac{T_3 - T_2}{C_2 - C_3}\right)(C - C_3) \quad (5)$$

From the foregoing, a general expression for the block position in feet of any cable layering can be expressed as follows:

$$BP \text{ (feet)} = X - (T_n - T_0) + \left(\frac{T_n - T_{n-1}}{C_{n-1} - C_n}\right)(C - C_n) \quad (6)$$

It is to be further understood that the circuitry illustrated in detail in FIG. 4 is merely representative of one embodiment of the drum position encoder of the present invention. In accordance with such embodiment, the following TABLE II sets forth specific types and values of the circuit components.

TABLE II

| Reference Designation | Description |
| --- | --- |
| Hall Magnetic Field Sensors 40, 44 | BH203 (F. W. Bell) |
| Operational amplifiers 41, 42 | 606M (Analog Devices) |
| Comparators 45, 46 | 734 (Fairchild) |
| Inverters 52, 54, 56, 58 | 7414 (Texas Instruments) |
| One-shots 53, 55, 57, 59 | 74123 (Fairchild) |
| Gates 60–67 | 7400 (Fairchild) |
| Gates 68, 69 | 74H21 (Fairchild) |
| Counters 48–51 | 74192 (Fairchild) |
| Pulse amplifiers 43, 47 | NE555 (Fairchild) |
| Optical Isolators 50, 51 | MCT2 (Monsanto) |

Various modifications, as well as alternate embodiments, to the means of detecting the drawworks drum movement may be employed. For example, the encoding and detection can be carried out optically. The drum can be encoded with black and white sectors, reflectance from such sectors being measured by means of photocells. It is therefore to be understood that such modifications or alterations may be made therein without departing from the spirit and scope of the invention as set forth in the appended claims.

We claim:

1. In a method for drilling a well with a drill bit fixed to the lower end of a drill string suspended from a traveling block moving in response to movement of a cable extending from a drawworks drum and arranged over one or more sheaves mounted in a crown block, the steps comprising:
   (a) lowering the traveling block to its lowest position,
   (b) measuring the distance from said lowest position of the traveling block to a selected reference point,
   (c) determining the rotational position of the drum for said lowest position of the traveling block,
   (d) raising the traveling block to a second position at which one full layering of cable is wound onto the drum,
   (e) measuring the distance from said position of the traveling block to said reference point,
   (f) determining the rotational position of the drum for said second position of the traveling block,
   (g) repeating steps (d) – (f) for each full layering $n$ of cable wound onto the drum before the traveling block reaches its maximum distance above said reference point, and
   (h) thereafter determining the position of the traveling block at any given time during drilling operations for any cable layering in accordance with the following expression:

$$X' = X - (T_n - T_0) + \left(\frac{T_n - T_{n-1}}{C_{n-1} - C_n}\right)(C' - C_n)$$

wherein,
   $X =$ the value of $X'$ when the traveling block is in its lowest position,
   $T_n =$ distance from the traveling block to said selected reference point for $n$ layers of cable wound onto the drum,
   $T_0 =$ distance from the lowest position of the traveling block to said selected reference point,
   $C_n =$ rotational position of the drum for $n$ layers of cable wound onto the drum, and
   $C' =$ rotational position of the drum at any given time.

2. The method of claim 1 wherein the rotational movement of said drum is measured by the steps of:
   (a) affixing a plurality of identifiable markings to the drum, and
   (b) detecting movement of the identifiable markings as the drum rotates so as to produce a pair of signals whose frequency contents represent the rate of rotation of the drum and whose phase relationship represents the direction of rotation of the drum.

3. The method of claim 2 wherein the identifiable markings are magnetic markings, the movement of which is detected by means of magnetic sensors.

4. The method of claim 2 wherein the rotational position of the drum for the lowest position of the traveling block is identified by a predetermined number of said signals.

* * * * *

UNITED STATES PATENT AND TRADEMARK OFFICE
CERTIFICATE OF CORRECTION

PATENT NO. : 4,114,435

DATED : September 19, 1978

INVENTOR(S) : Bobbie J. Patton et al

It is certified that error appears in the above-identified patent and that said Letters Patent are hereby corrected as shown below:

On title and abstract page,
Column 2, line 1, after "in" delete "a".

Column 6, line 8, after "direction" insert a period (.).

Column 6, lines 55, 56, and 57, (under the column entitled "Block Position (feet)" should read:

$$--X-(T_2-T_0)$$
$$X-(T_3-T_0)$$
$$X-(T_4-T_0)--.$$

Signed and Sealed this

Twenty-eighth Day of November 1978

[SEAL]

Attest:

RUTH C. MASON
Attesting Officer

DONALD W. BANNER
Commissioner of Patents and Trademarks